United States Patent
Waniss

(10) Patent No.: US 9,035,744 B2
(45) Date of Patent: May 19, 2015

(54) METHOD AND APPARATUS FOR MONITORING AND CONTROLLING A MEDICAL DEVICE USING A WIRELESS MOBILE COMMUNICATION DEVICE

(75) Inventor: Amgad Mofied Waniss, Waterloo (CA)

(73) Assignee: BlackBerry Limited, Waterloo (CA)

( * ) Notice: Subject to any disclaimer, the term of this patent is extended or adjusted under 35 U.S.C. 154(b) by 1239 days.

(21) Appl. No.: 12/572,113

(22) Filed: Oct. 1, 2009

(65) Prior Publication Data
US 2011/0081888 A1 Apr. 7, 2011

(51) Int. Cl.
G05B 19/00 (2006.01)
G08B 1/08 (2006.01)
H04W 4/00 (2009.01)
H04M 1/66 (2006.01)
H04M 3/00 (2006.01)
H04M 1/725 (2006.01)
H04M 1/67 (2006.01)

(52) U.S. Cl.
CPC ............ *H04M 1/72527* (2013.01); *H04M 1/67* (2013.01); *H04M 1/72538* (2013.01)

(58) Field of Classification Search
USPC .............................................. 340/5.8, 539.11
See application file for complete search history.

(56) References Cited

U.S. PATENT DOCUMENTS

| 5,411,535 | A | 5/1995 | Fujii et al. | |
|---|---|---|---|---|
| 7,069,078 | B2 | 6/2006 | Houben | |
| 2004/0082361 | A1* | 4/2004 | Rajagopalan | 455/556.1 |
| 2007/0178921 | A1* | 8/2007 | Cutler et al. | 455/502 |
| 2007/0184837 | A1 | 8/2007 | Hohl et al. | |
| 2008/0119705 | A1 | 5/2008 | Patel | |
| 2008/0147050 | A1 | 6/2008 | Mann et al. | |
| 2008/0266051 | A1* | 10/2008 | Taki et al. | 340/5.1 |

(Continued)

FOREIGN PATENT DOCUMENTS

| WO | 2004070995 A2 | 8/2004 |
|---|---|---|
| WO | 2008097316 A1 | 8/2008 |

(Continued)

OTHER PUBLICATIONS

Healthanywhere, downloaded from http://www.igeacare.com/HealthAnywhere/Personal/products_health_on_the_go.htm.

(Continued)

*Primary Examiner* — Jennifer Mehmood
*Assistant Examiner* — Pameshanand Mahase
(74) *Attorney, Agent, or Firm* — Perry + Currier Inc.

(57) ABSTRACT

A medical device connector is provided for facilitating monitoring and control of a medical device by at least one of a plurality of wireless mobile communication devices. The medical connector includes a memory, a communication subsystem for exchanging messages with at least one of the wireless mobile communication devices. The medical connector further includes a microprocessor for authenticating the wireless mobile communication device, assigning a role to the wireless mobile communication device and transmitting a confirmation to the wireless communication device via the communication subsystem. If the wireless mobile communication device is not authenticated then the microprocessor transmits a request failure to the wireless mobile communication device via the communication subsystem. The connector also includes a data port for monitoring data from the medical device and controlling the medical device in response to control actions received from the wireless mobile communication device.

13 Claims, 7 Drawing Sheets

(56) References Cited

U.S. PATENT DOCUMENTS

| | | |
|---|---|---|
| 2008/0267147 A1 | 10/2008 | Niranjan et al. |
| 2009/0058636 A1* | 3/2009 | Gaskill et al. ............ 340/539.11 |
| 2010/0315198 A1* | 12/2010 | Jurisch ............................ 340/5.2 |

FOREIGN PATENT DOCUMENTS

| | | |
|---|---|---|
| WO | 2009050477 A1 | 4/2009 |
| WO | 2009006303 A1 | 5/2009 |
| WO | 2009071205 A2 | 6/2009 |

OTHER PUBLICATIONS

Cellular Radio Telecommunication for Health Care: Benefits and Risks, downloaded from http://www.pubmedcentral.nih.gov/articlerender.fcgi?artid=524627.

Sensors Help Keep the Elderly Safe, and at Home, by John Leland, downloaded from http://www.nytimes.com/2009/02/13/us/13senior.html?_r=1&em.

Halperin, Daniel et al.: "Pacemakers and Implantable Cardiac Defibrillators: Software Radio Attacks and Zero-Power Defenses", 2008 IEEE Symposium on Security and Privacy.

European Search Report dated Nov. 18, 2009 in European Patent Application No. 09171951.8.

Sneiderman, Charles A., et al. "Cellular Radio Telecommunication for Health Care: Benefits and Risks", Journal of the American Medical Informatics Association, vol. 11, No. 6, Nov./Dec. 2004.

Leland, John, "Sensors Help Keep the Elderly Safe, and at Home", The New York Times, Feb. 13, 2009.

HealthyAnywhere, "Health on the go", <http://www.igeacare.com/HealthAnywhere/Personal/products_health_on_the_go.htm>, retrieved on Oct. 1, 2009.

Corresponding European Patent Application No. 09171951.8, Summons to Attend Oral Proceedings Pursuant to Rule 115(1) EPC, Oct. 21, 2014.

* cited by examiner

METHOD AND APPARATUS FOR MONITORING AND CONTROLLING A MEDICAL DEVICE USING A WIRELESS MOBILE COMMUNICATION DEVICE

TECHNICAL FIELD

The present disclosure relates generally to medical devices, and more particularly to a method and apparatus for controlling a medical device using a wireless mobile communication device.

BACKGROUND

Medical devices such as insulin pumps and heart-regulation devices are commonly used by patients who may be unable to independently monitor, react to and/or operate such devices (e.g. patients who are infirm, elderly or children). In situations such as this, the patients must depend on caregivers to oversee their treatment using such devices. For example, a young child who has been diagnosed with "type I" diabetes may receive treatment using an insulin pump for real-time supply of insulin to regulate the child's blood glucose levels. The child's parents and/or caregivers monitor glucose levels, make decisions on how much insulin is required, and then control the pump to deliver the required flow of insulin. It will be appreciated that the patient is therefore highly dependent on caregivers to provide life-critical care.

In an effort to provide some measure of flexibility and mobility to caregivers, systems are known for providing remote monitoring of a patient by a caregiver. For example, United States Patent Publication No. 2008/0119705 discloses a connector that may be attached to a consumer electronic device, such as a cellular telephone, personal digital assistant, etc., to allow communication between the consumer electronic device and a medical device, such as an infusion device, implantable pump, glucose meter, etc.

DETAILED DESCRIPTION

Figure 1:
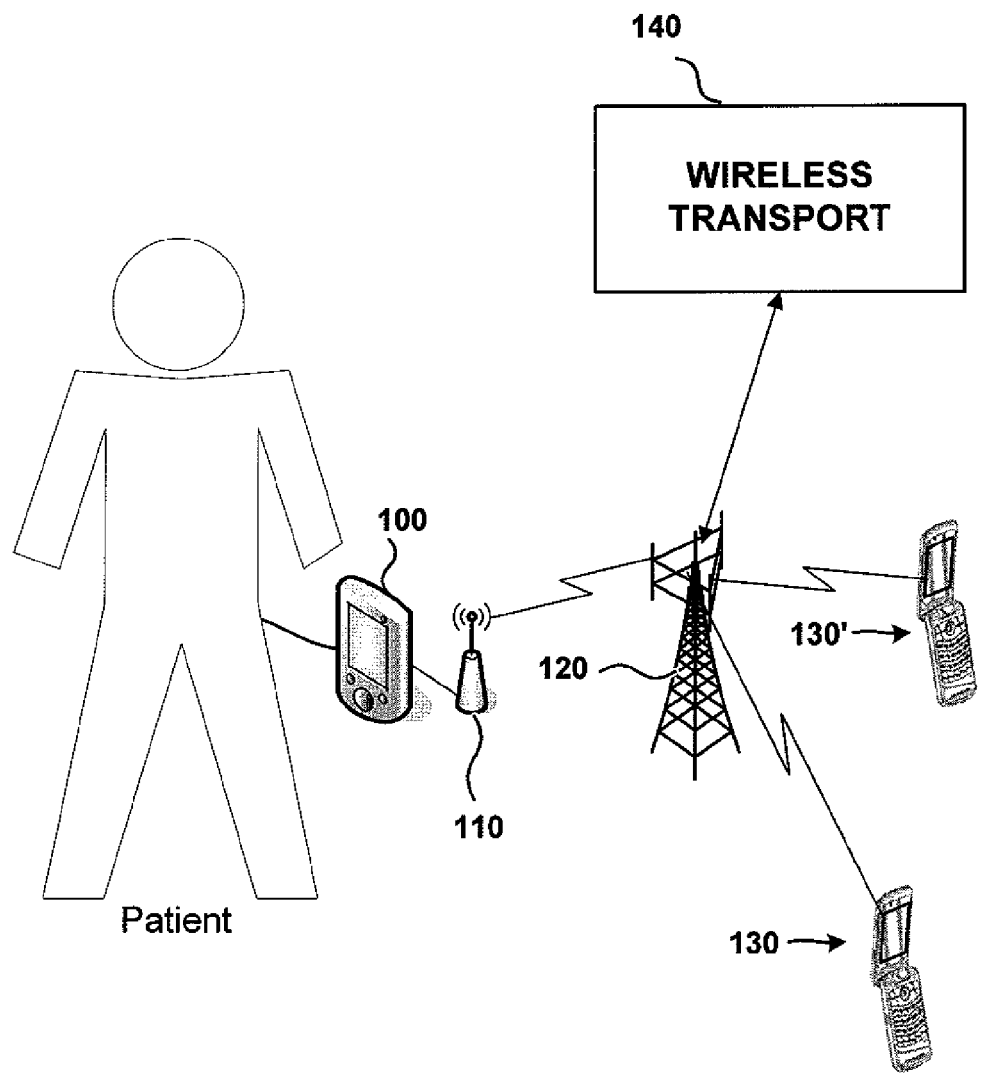
FIG. 1 is a block diagram of an exemplary or illustrative system for monitoring and controlling a medical device using wireless mobile communication devices, in accordance with the present disclosure.

According to an aspect of this specification, there is provided a method for monitoring and controlling a medical device using at least one of a plurality of wireless mobile communication devices, comprising transmitting an add request to one of said plurality of wireless mobile communication devices, said add request including an ID and a request key; receiving a device-ID and authentication key from said one of said plurality of wireless mobile communication devices; processing said authentication key to determine if said wireless mobile communication device is an authenticated wireless mobile communication device and if said wireless mobile communication device is authenticated then assigning a role to said wireless mobile communication device, storing said device-ID, authentication key and role in a list of authenticated wireless mobile communication devices, and transmitting a confirmation to said wireless communication device, wherein said role includes permissions for monitoring and controlling said medical device, and if said wireless mobile communication device is not authenticated then transmitting a request failure to said wireless mobile communication device; and enabling at least one of monitoring data from said medical device and controlling said medical device by said authenticated wireless mobile communication device.

According to another aspect, there is provided a medical device connector for facilitating monitoring and control of a medical device by at least one of a plurality of wireless mobile communication devices, comprising a memory; a communication subsystem for transmitting an add request to one of said plurality of wireless mobile communication devices, said add request including an ID and a request key, and receiving a device-ID and authentication key from said one of said plurality of wireless mobile communication devices; a microprocessor executing a software application for processing said authentication key to determine if said wireless mobile communication device is an authenticated wireless mobile communication device and if said wireless mobile communication device is authenticated then assigning a role to said wireless mobile communication device, storing said device-ID and authentication key in a list of authenticated wireless mobile communication devices within said memory, and transmitting a confirmation to said wireless communication device, said role including permissions for monitoring and controlling said medical device, and if said wireless mobile communication device is not authenticated then transmitting a request failure to said wireless mobile communication device via said communication subsystem; and a data port for monitoring data from said medical device and transmitting data received from said authenticated wireless mobile communication device via said communication subsystem for controlling said medical device.

According to a further aspect of this specification, there is provided a method of operating a wireless mobile communication device for monitoring and control of a medical device connected to a medical device connector, comprising receiving an add request from said medical device connector, said add request including an ID and a request key; processing said add request and in response generating a device-ID and authentication key; transmitting said device-ID and authentication key to said medical device connector; receiving one of either a confirmation that said wireless mobile communication device has been authenticated by said medical device connector, said confirmation including a medical connector device-ID and a role assigned to said wireless mobile communication device, or a request failure in the event said wireless mobile communication device is not authenticated by said medical device connector; and in the event of receipt of said confirmation then storing said medical device connector ID assigned role and authentication key in a list of authenticated medical device connectors; or in the event of receipt of said request failure then logging said failure.

According to yet another aspect of this specification, there is provided a mobile communication device for facilitating monitoring and control of a medical device via a medical device connector, comprising a memory; a communication subsystem for receiving an add request from said medical device connector, said add request including an ID and a request key; a microprocessor executing a software application for processing said add request and in response generating a device-ID and authentication key, transmitting said device-ID and authentication key to said medical device connector and receiving via said communication subsystem one of either a confirmation that said wireless mobile communication device has been authenticated by said medical device connector, said confirmation including a medical connector device-ID and a role assigned to said wireless mobile communication device, or a request failure in the event said wireless mobile communication device is not authenticated by said medical device connector, and storing said one of either said confirmation and authentication key or said request failure in said memory.

FIG. 1 shows a system for enabling multiple caregivers to communicate with and control a medical device 100 via their wireless mobile communication devices 130, 130', etc. As discussed above, medical device 100 may be any device that provides treatment to a patient, such as an insulin pump, heart-regulation device, etc. According to an exemplary embodiment, an intelligent medical device connector (MDC) 110 is connected to the device 100 in order to facilitate communication over a wireless network 120 with caregiver mobile communication devices 130, 130'. Alternatively, the functionality of MDC 110 may be incorporated into the device 100, and a typical user may perceive medical device 100 and MDC 110 as a single device. For purposes of illustration, medical device 100 and MDC 110 will be described as distinct devices. Wireless communications over network 120 are controlled by a wireless transport 140, in a well-known manner.

The illustrated system obviates the need of the caregiver(s) to be physically present with the patient at all times in order to control the device 100. The caregiver(s) is (are) able to remotely control the device 100 in order to obtain medical data (e.g. glucose levels, blood pressure, pulse, etc.) from the device 100 and to control operation of the device (e.g. insulin output, pacemaker rhythm, etc.) from a remote location. Moreover, as discussed in greater detail below, according to an exemplary embodiment, wireless transport 140 provides secure authentication and selection between multiple caregiver devices 130, 130', etc., so that responsibility for monitoring and treating the patient can be safely and securely shared.

Figure 2:
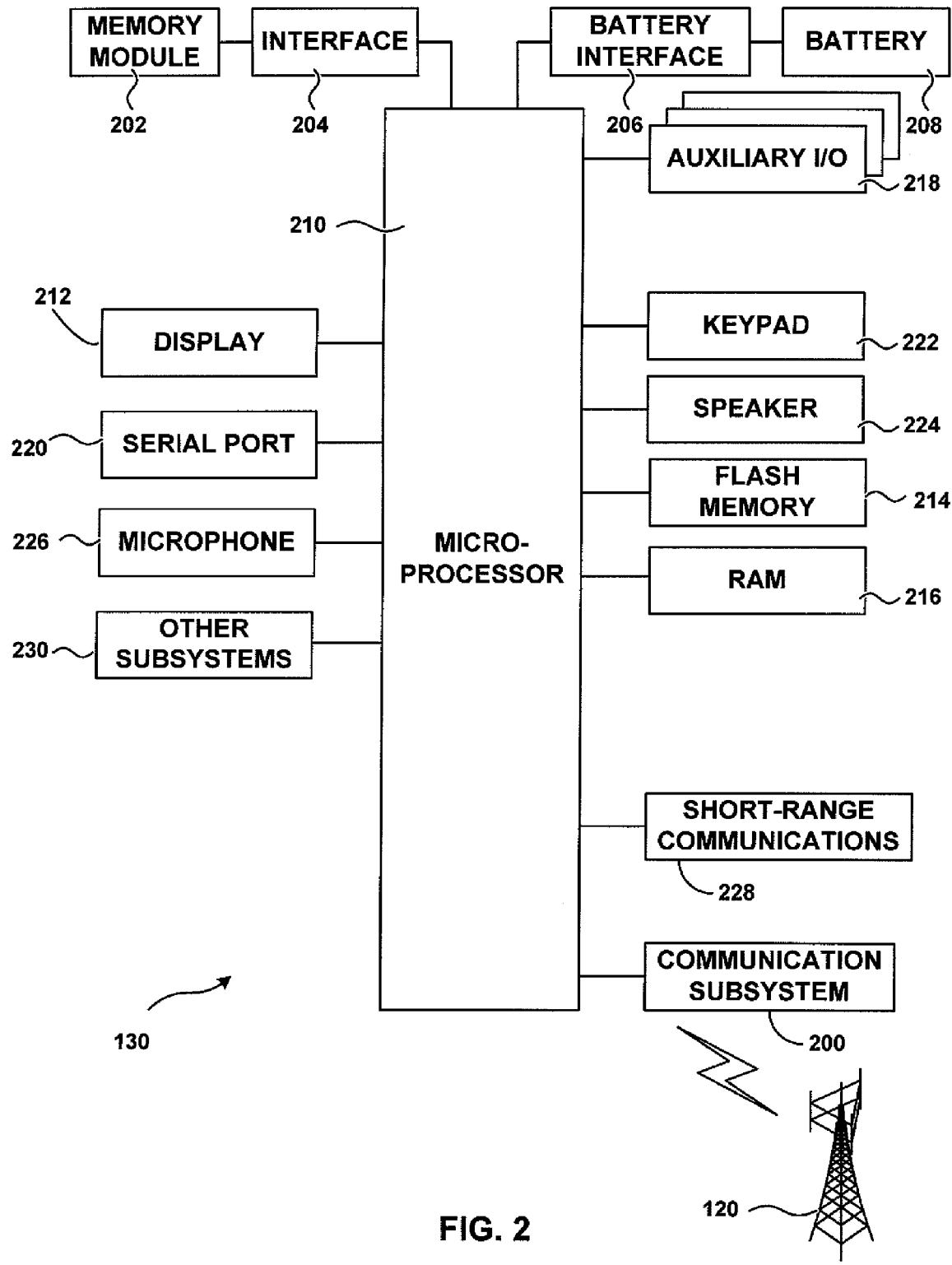
FIG. 2 is block diagram illustrating a wireless mobile communication device in accordance with the present disclosure.

FIG. 2 shows a block diagram illustrating some of the components of an illustrative wireless mobile communication devices 130, 130', etc. In the embodiment depicted in FIG. 2, wireless mobile communication device 130 includes a communication subsystem 200 for wireless two-way data and voice communication with the wireless network 120. Communication subsystem 200 may include one or more receivers, transmitters, antennas, signal processors and other components associated with wireless communications. The particular design of the communication subsystem 200 depends on the network in which the wireless mobile communication device 130 is intended to operate. The concepts herein may be applicable to a variety of wireless mobile communication devices, such as two-way pagers, cellular telephones, etc.

In the embodiment shown in FIG. 2, network access is associated with a subscriber or user of the wireless mobile communication device 130 via a memory module 202, which may be a Subscriber Identity Module (SIM) card for use in a GSM network or a Universal Subscriber Identity Module (USIM) card for use in a Universal Mobile Telecommunication System (UMTS). The SIM card is inserted in or connected to an interface 204 of the wireless mobile communication device 130 to operate in conjunction with the wireless network 120. Alternatively, the wireless mobile communication device 130 may have an integrated identity module for use with systems such as Code Division Multiple Access (CDMA) systems.

The wireless mobile communication device 130 also includes a battery interface 206 for receiving at least one rechargeable battery 208. The battery 208 provides electrical power to at least some of the electrical circuitry in the wireless mobile communication device 130, and the battery interface 206 provides a mechanical and electrical connection for the battery 208.

The wireless mobile communication device 130 includes a microprocessor 210 which controls the overall operation of the device. Communication functions, including at least data and voice communications, and which may include the data communications pertaining to glucose levels as discussed in more detail below, are performed through the communication subsystem 200, as discussed above. The microprocessor 210 also interacts with additional device subsystems such as a display 212, flash memory 214, a random access memory (RAM) 216, auxiliary input/output (I/O) subsystems 218, a data port such as serial port 220, keypad 222, speaker 224, microphone 226, a short-range (i.e. near field) communications subsystem 228, and any other device subsystems generally designated as 230. The microprocessor may further interact with other components, which for simplicity are not shown in FIG. 2.

The microprocessor 210, in addition to its operating system functions, enables execution of software applications on the wireless mobile communication device 130. Software, which may include operating system software or application software, may be stored in flash memory 214, RAM 216 or any other memory element. As will be discussed below, according to an exemplary embodiment, application software is provided to permit the wireless mobile communication device 130 to monitor data received from MDC 110 and provide signals for controlling the medical device 100 via the MDC 110 of FIG. 1. This application software may be stored in any memory element of the wireless mobile communication device 130, or any medium configured to store machine-executable instructions that can be carried out by the microprocessor 210.

A predetermined set of applications that control basic device operations, including data and voice communication applications, will normally be installed on the wireless mobile communication device 130 during or after manufacture. The wireless mobile communication device 130 may include a personal information manager (PIM) application having the ability to organize and manage data items relating to a user such as, but not limited to, instant messaging, email, calendar events, voice mails, appointments, and task items.

For voice communications, the wireless mobile communication device 130 may receive one or more signals associated with a voice communication, such as an indication of the identity of a calling party. In response to the received signals, the microprocessor 210 may generate output for display on display 212 and/or the speaker 224.

In a data communication mode, a received data signal representing information such as a glucose levels, is received and processed by the communication subsystem 200 and input to the microprocessor 210, which further processes the signal. In response to the received data signal, the microprocessor 210 may generate output for display on the display 212 (e.g. a graphical representation of current and historical glucose levels).

In addition, as discussed briefly above, a short-range communications subsystem 228 is provided for communication between the wireless mobile communication device 130 and different systems or devices, which need not necessarily be similar devices. For example, the short-range communications subsystem 228 may include an infrared device and associated circuits and components, or a wireless bus protocol compliant communication mechanism such as a Bluetooth™ communication module to provide for communication with similarly-enabled systems and devices. In another embodiment, the short-range communications subsystem 228 may be a wireless networking communications subsystem, conforming to IEEE 802.11 standards such as one or more of 802.11b, 802.11g, or 802.11n. Data communications pertaining to glucose levels may also be sent to or received by the short-range communications subsystem 228, but in typical operation, data communications pertaining to glucose levels may be sent to or received by the communication subsystem 200.

The wireless mobile communication devices 130, 130', etc may include one or more circuit boards (not shown) that implement the components described above. This disclosure is not limited to any particular electronic component or software module or any combination thereof.

Figure 3:
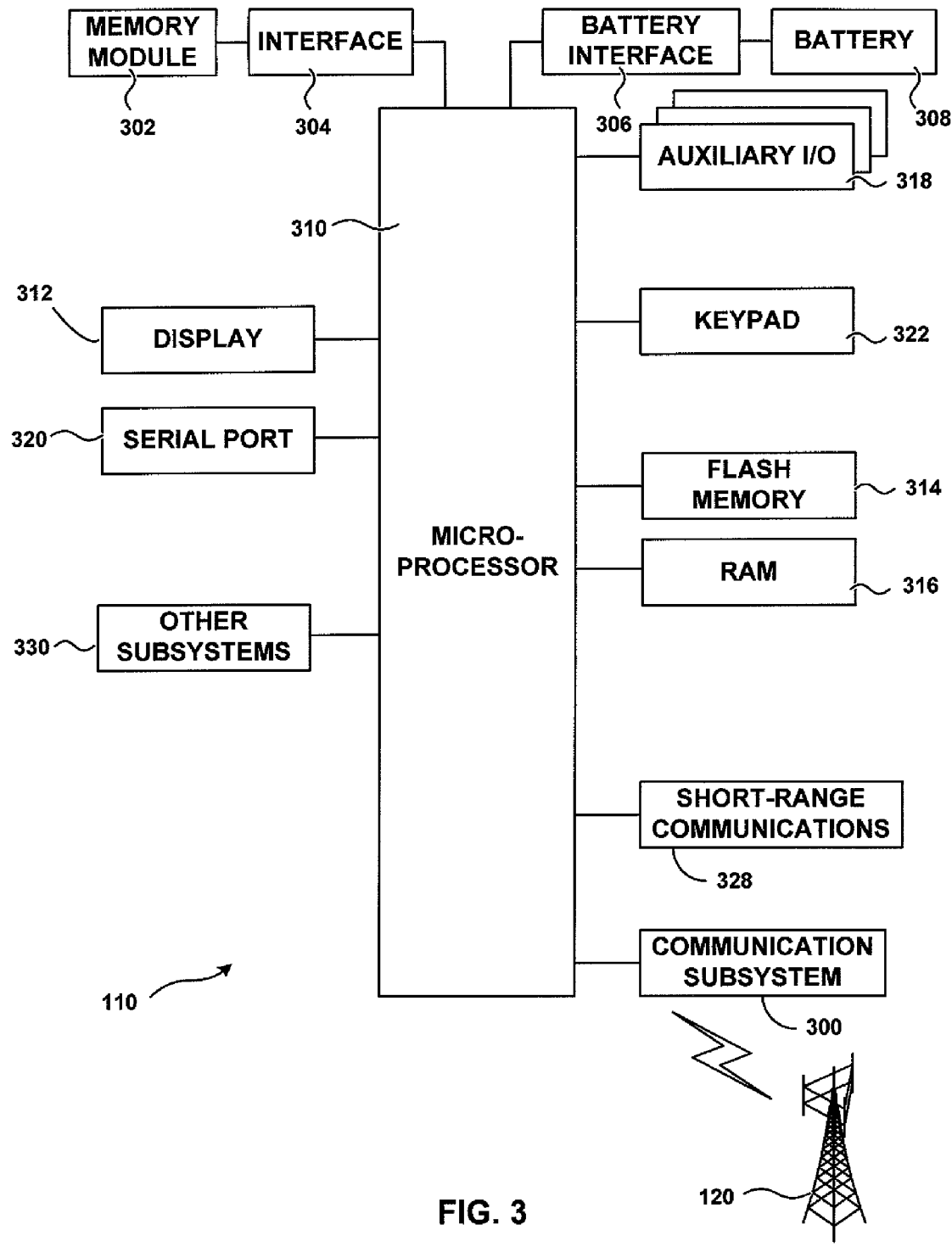
FIG. 3 is a block diagram of an exemplary medical device connector to the medical device for facilitating communication with a wireless mobile communication device in accordance with the present disclosure.

FIG. 3 shows a block diagram illustrating components of the MDC 110 for facilitating communication between medical device 100 and the wireless mobile communication devices 130, 130', etc. In the illustrative embodiment of FIG. 3, the functional components of MDC 110 are similar to those of the mobile communication device 130 of FIG. 2, with the exception that there is no provision for voice communications and the user interface is greatly simplified. Thus, according to the illustrative embodiment of FIG. 3, the MDC 110 is a 'stripped down' version of mobile communication device 130. The concepts described herein are not limited, however, to an MDC that is a 'stripped down' version of mobile communication device 130.

In the embodiment depicted in FIG. 3, MDC 110 includes a communication subsystem 300 for wireless two-way data and voice communication with the wireless network 120. Communication subsystem 300 may include one or more receivers, transmitters, antennas, signal processors and other components associated with wireless communications. The particular design of the communication subsystem 300 depends on the network in which the MDC 110 is intended to operate (e.g. wireless cellular network).

In the embodiment shown in FIG. 3, network access is associated with a subscriber or user of the MDC 110 via a memory module 302, which may be a Subscriber Identity Module (SIM) card for use in a GSM network or a Universal Subscriber Identity Module (USIM) card for use in a Universal Mobile Telecommunication System (UMTS). The SIM card is inserted in or connected to an interface 304 of the MDC 110 to operate in conjunction with the wireless network 120. Alternatively, the MDC 110 may have an integrated identity module for use with systems such as Code Division Multiple Access (CDMA) systems.

The MDC 110 also includes a battery interface 306 for receiving at least one rechargeable battery 308. The battery 308 provides electrical power to at least some of the electrical circuitry in the MDC 110, and the battery interface 306 provides a mechanical and electrical connection for the battery 308.

The MDC 110 includes a microprocessor 310 which controls the overall operation of the device. Communication functions, including at least data communications, are performed through the communication subsystem 300, as discussed above. The microprocessor 310 also interacts with additional device subsystems such as a display 312, flash memory 314, a random access memory (RAM) 316, auxiliary input/output (I/O) subsystems 318, a data port such as serial port 320 for connection to the medical device 100, optional keypad 322, a short-range (i.e. near field) communications subsystem 328 which can serve as an alternative data port to the serial port 320, for wireless communication with medical device 100 (e.g. via Bluetooth®, WiFi, etc.), and any other device subsystems generally designated as 330. The microprocessor 310 may further interact with other components, which for simplicity are not shown in FIG. 3.

The microprocessor 310, in addition to its operating system functions, enables execution of software applications on the MDC 110. Software, which may include operating system software or application software, may be stored in flash memory 314, RAM 316 or any other memory element. As will be discussed below, according to an exemplary embodiment, application software is provided to permit the MDC 110 to receive data from and provide control signals for control the medical device 100 of FIG. 1. A predetermined set of applications that control basic device operations, including data communication applications, will normally be installed on the MDC 110 during or after manufacture.

In operation, according to an exemplary embodiment, data/command signals are exchanged between the medical device 100 and MDC 110 via a wired or wireless connection, such as serial port 320 for receiving information such as a glucose levels that is then wirelessly transmitted to a mobile communication device 130, 130', etc. via the communication subsystem 300, and for controlling the device 100 (e.g. administer a regulated dosage) under control of mobile communication device 130, 130', etc.

In another embodiment, data/command signals may be exchanged via short-range communications subsystem 328, for example using an infrared device and associated circuits and components, or a wireless bus protocol compliant communication mechanism such as a Bluetooth™ communication module to provide for communication with similarly-enabled systems and devices. In a further embodiment, the short-range communications subsystem 328 may be a wireless networking communications subsystem, conforming to IEEE 802.11 standards such as one or more of 802.11b, 802.11g, or 802.11n. In yet another embodiment, data/command signals are exchanged via any other suitable generic data exchange mechanism (e.g. mini-USB, etc.).

The MDC 110 may include one or more circuit boards (not shown) that implement the components described above. This disclosure is not limited to any particular electronic component or software module or any combination thereof.

Figure 4:
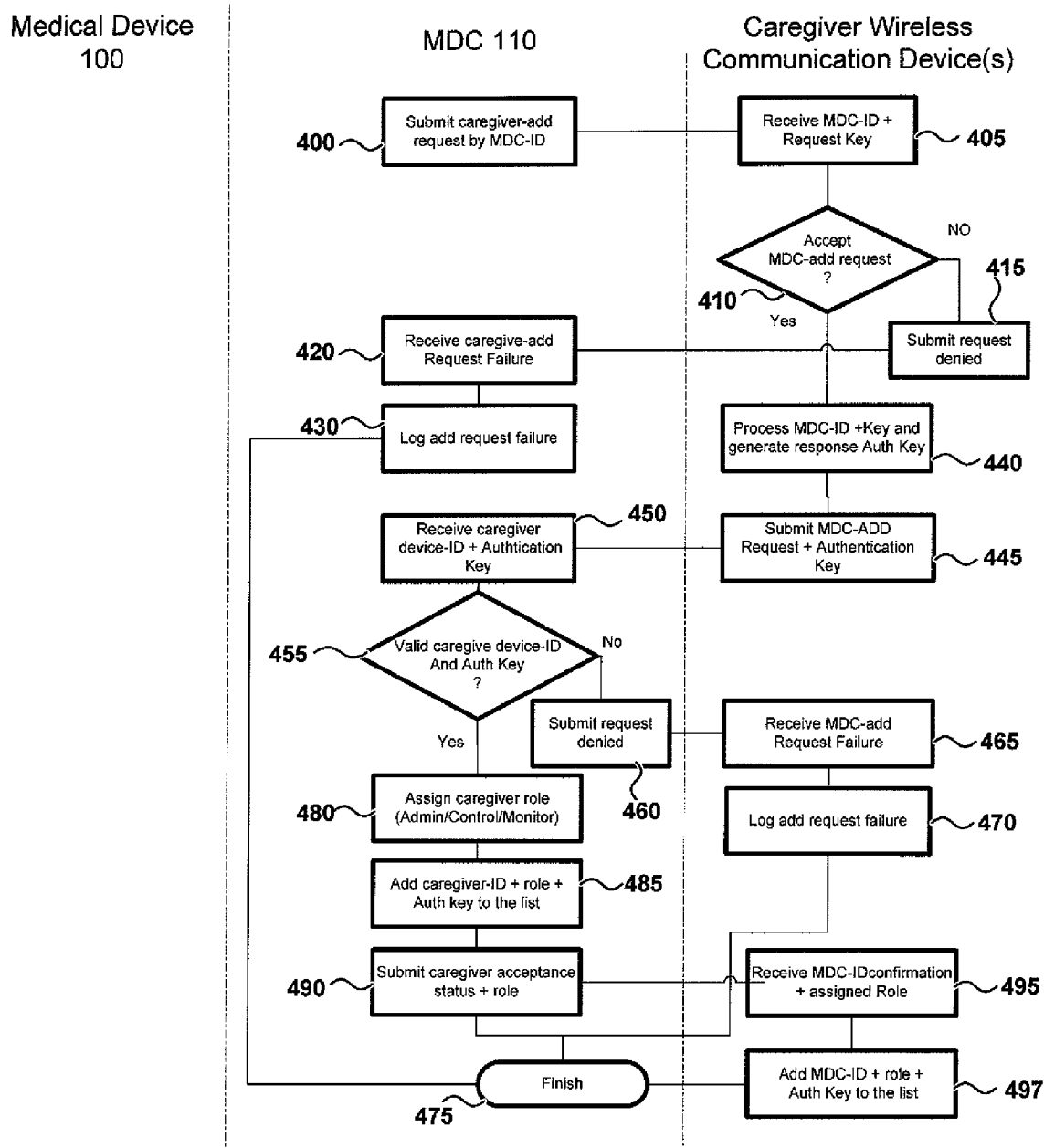
FIG. 4 is a flow diagram showing configuration of a wireless mobile communication device to communicate with the medical device, via a medical device connector, in a predetermined role, thereby allowing a caregiver to remotely monitor and control the medical device.

In operation, with reference to the flowchart of FIG. 4, a plurality of wireless mobile communication devices 130, 130', etc., of FIGS. 2 and 3 may be configured permitting multiple caregivers to remotely monitor and control a medical device 100 via MDC 110. Specifically, MDC 110 may be caused to submit a request to add a specific caregiver, for example by entering a suitable command via keypad 322. The request to add a specific caregiver may identify a mobile communication device 130 and may also request one or more possible caregiver roles with associated assigned permission, as discussed below. The MDC 110 sends a request message (step 400) to the caregiver's mobile communication device 130. The request message includes an identifier (MDC-ID) for the requesting device 110. The request message is transmitted over the network 120 and received at mobile communication device 130 (step 405). An application executed by microprocessor 210 within device 130 determines whether or not to accept the caregiver request (step 410). If not, wireless mobile communication device 130 transmits a denial message to the MDC 110 (step 415). The denial message is received by the MDC 110 (step 420), which then logs the request failure (step 430) and the communication exchange finishes (step 475). Authentication serves to protect the patient from malevolent acquisition of private medical data and/or potentially life-threatening remote control of the medical device 100.

If the caregiver-add request message is accepted (a "YES" at step 410), the mobile communication device 130 processes the request and generates an authentication key (step 440). The mobile communication device 130 then generates and transmits a MDC-ADD request that contains the caregiver device-ID along with the authentication key (step 445). Information in addition to the MDC-ADD request with the caregiver device-ID and the authentication key may also be transmitted. In the event the mobile communication device 130 is presented with options pertaining to a caregiver role with associated assigned permission, for example, a communication pertaining to a selected caregiver role may be transmitted as well. The MDC-ADD request with caregiver device-ID and authentication key are received by the MDC 110 (step 450), and an application executed by microprocessor 310 within MDC 110 determines whether or not it has received a valid caregiver device-ID and authentication key (step 455). If not (step 460), MDC 110 transmits a failure message which is received by the mobile communication device 130 (step 465). The add request failure message is logged (step 470) and the communication exchange finishes (step 475). Failure to receive a valid caregiver device-ID and authentication key does not lead the MDC 110 to accept commands pertaining to caregiving from the mobile communication device 130.

On the other hand, if a valid caregiver device-ID and authentication key are received (step 480), MDC 110 assigns a requested caregiver role (step 480), such as Admin, Control, Monitor, and adds the caregiver device-ID, role and authentication key to a list (step 485) maintained in memory (e.g., flash memory 314). The assigned role permission data that defines what permissions will be assigned to mobile communication device 130, including permission to monitor status/data of the medical device 100 (i.e. read permission), to control the medical device 100 (i.e. read/write permission), and/or to act as an Administrator (i.e. capable of assigning roles to other authenticated ones of the mobile communication devices 130', etc. The MDC 110 then transmits a message for accepting the caregiver in the requested role (step 490). The caregiver acceptance message (including MDC-ID confirmation and the assigned role) is received by mobile communication device 130 (step 495), and the MDC-ID, role and authentication key are added to a list maintained in memory (e.g. flash memory 214). The communication exchange then finishes (step 475).

Figure 5:
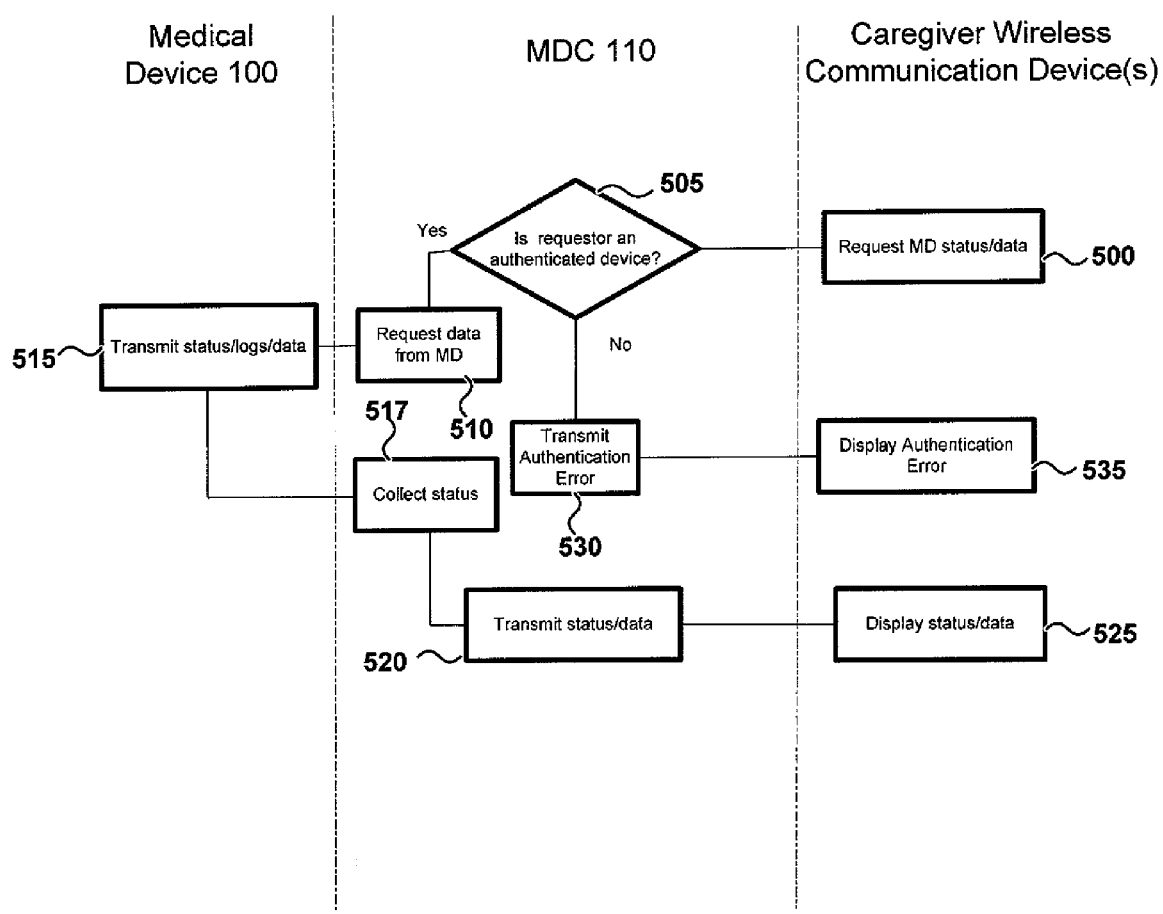
FIG. 5 is a flow diagram showing monitoring, via the medical device connector, of data from a medical device by an authenticated wireless mobile communication device and presentation of the data thereon in accordance with the present disclosure.

FIG. 5 is a flow diagram showing monitoring of medical device 100 by an authenticated wireless mobile communication device 130 and presentation of the data thereon. The device 130 sends a request for status/data relating to medical device 100 (step 500), wherein the request includes the device-ID and authentication key. The request is received by MDC 110 which then determines (step 505) if the requesting device 130 is an authenticated device by checking the device-ID and authentication key against the list saved in memory (see step 485). If the device 130 is authenticated (a "YES" at step 505), MDC 110 then requests the relevant data (e.g. blood glucose level, blood pressure, etc.) from medical device 100 (step 510). The device 100 then transmits the requested data to the MDC 110 via serial port 320 or other port (step 515). The MDC 110 wirelessly collects the status data (step 517) and transmits the requested data to mobile communication device 130 (step 520) which in response displays the data for viewing by the caregiver (step 525).

On the other hand, if the caregiver device is not authenticated (i.e. a "NO" at step 505) the MDC 110 transmits an authentication error to the mobile communication device 130 (step 530) which in response generates an error message (step 535). In this event, status data is not collected and transmitted to mobile communication device 130.

Figure 6:
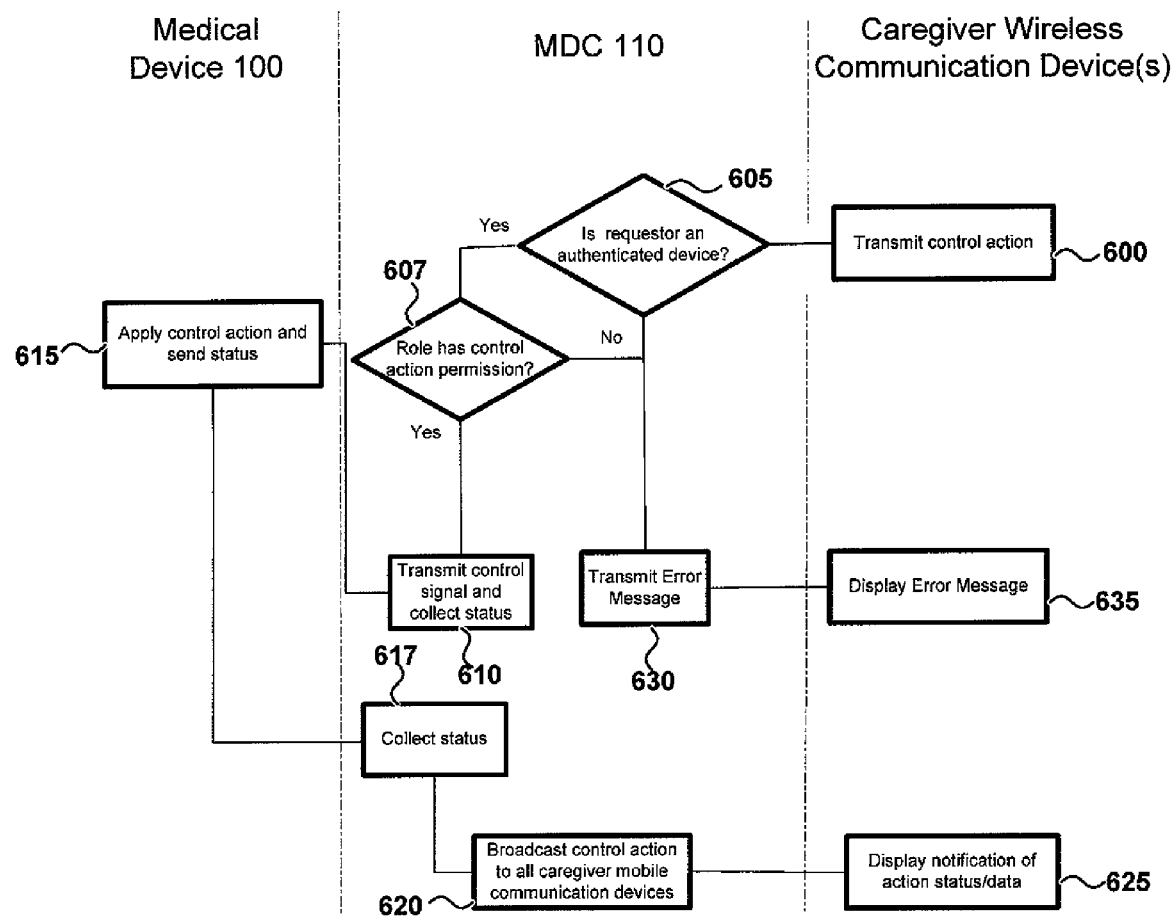
FIG. 6 is a flow diagram showing control of the medical device, via a medical device connector, by the authenticated wireless mobile communication device in accordance with the present disclosure.

FIG. 6 is a flow diagram showing control of the medical device 100 by an authenticated wireless mobile communication device 130. The device 130 sends a request for control action (step 600) for controlling operation of medical device 100 (e.g. administering a dose of insulin or other medication), wherein the request for control action includes the device-ID and authentication key. The request for control action is received by MDC 110 which then determines (step 605) if the requesting device 130 is an authenticated device by checking the list saved in memory (see step 485). If the device 130 is authenticated (a "YES" at step 605), MDC 110 then determines (step 607) if the role of the authenticated caregiver includes permission to take control action at the medical device 100 (e.g. to administer medication, etc.). If yes, MDC 110 transmits the control action to the medical device 100 (step 610). The device 100 then executes the control action, and transmits status data to the MDC 110 via serial port 320 (step 615), or other suitable communication mechanism. The MDC 110 collects the status data (step 617) and wirelessly broadcasts the resulting status data to all mobile communication devices 130, 130' (step 620) each of which in response displays the data for viewing by the associated caregiver (step 625).

On the other hand, if the caregiver device is not authenticated (i.e. a "NO" at step 605) or does not have permission to control the medical device 100 (i.e. a "NO" at step 607), the MDC 110 transmits an error message to the mobile communication device 130 (step 630) which in response displays the error message (step 635). In this event, the MDC 110 transmits no control action to the medical device 100.

According to one embodiment, redundant, conflicting, or overlapping actions transmitted by multiple care giver mobile communication devices 130, 130', etc. to same patient MDC 110 may be resolved by programming into the MDC 110 predetermined governance criteria for handling such multi-sourced requested actions during race conditions, before applying the control action (step 615). Non-exhaustive examples of such governance criteria include predetermined thresholds for accumulative dose intake that can not be exceeded within a certain time period, requesting acknowledgement of a previous pending action transmitted by another care giver. etc.

Figure 7:
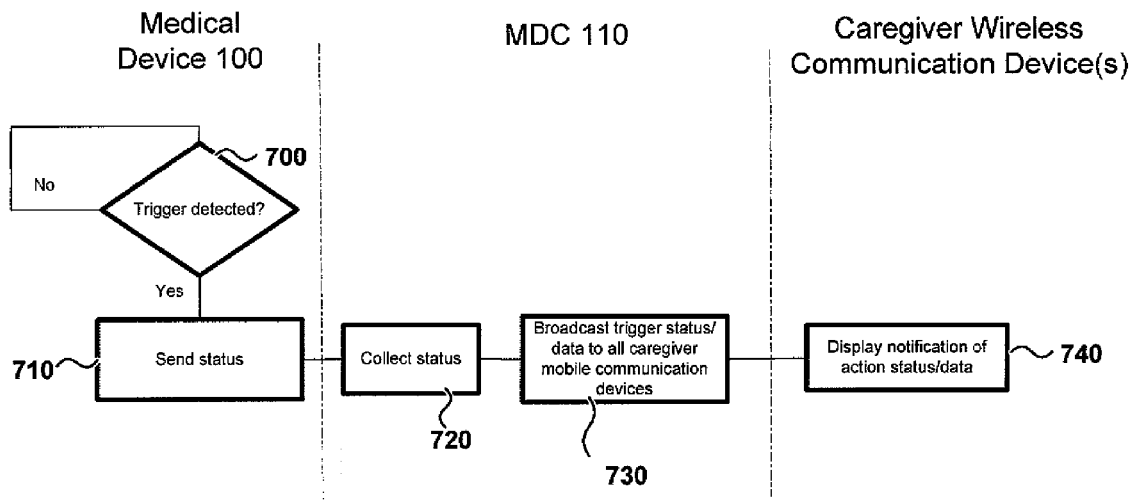
FIGS. 7 and 8 are flow diagrams showing two techniques for pushing of data from the medical device to an authenticated wireless mobile communication device, via the medical device connector, and presentation of the data thereon in accordance with the present disclosure.

With reference to the flowchart of FIG. 7, MDC 110 may be configured to push data from the medical device 100 to an authenticated wireless mobile communication device 130 in response to a trigger, such as an alarm occurring at the device 100 (e.g. excessively high/low blood glucose levels, excessively high/low blood pressure, excessively high/low pulse, etc.). The device 100 detects the trigger (a "YES" at step 700) and in response transmits a status message to the MDC 110 (step 710) via the serial port 320, or other suitable data exchange mechanism. The MDC 110 collects the status data (step 720) and wirelessly broadcasts the status data to all mobile communication devices 130, 130' (step 730) each of which in response displays the data for viewing by the associated caregiver (step 740) so that at least one of the caregivers can then take remedial action. The mobile communication devices 130, 130' may provide for techniques intended to attract a caregiver's attention to the data, such as an audible alarm, verbal alert, flashing display, device vibration, or the like.

Figure 8:
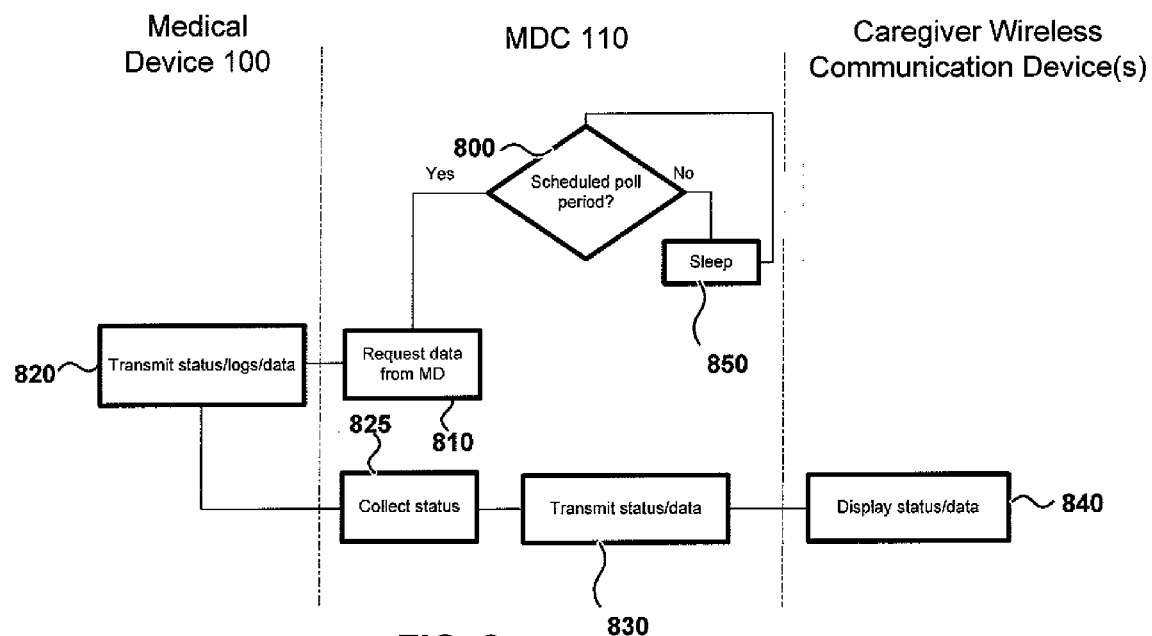

With reference to the flowchart of FIG. 8, MDC 110 may be configured to push data from the medical device 100 to an authenticated wireless mobile communication device 130 as a result of periodic polling of the device 100 by the MDC 110. One the periodic poll period occurs (a "YES" at step 800), MDC 110 requests the relevant data (e.g. blood glucose level, blood pressure, etc.) from medical device 100 (step 810). The device 100 then transmits the requested data to the MDC 110 via serial port 320 (step 820). The MDC 110 wirelessly collects the status data (step 825) and transmits the requested data to mobile communication device 130 (step 830) which in response displays the data for viewing by the caregiver (step 840). The mobile communication devices 130, 130' may provide for techniques for attracting a caregiver's attention to the data.

If the predefined polling period has not yet occurred (a "NO" at step 800), the MDC 110 operates in a low-power sleep mode (step 850), and no status data is collected or transmitted.

The illustrative embodiments set forth above may provide one or more advantages. For example, some embodiments may provide flexibility, in that a variety of wireless mobile communication devices may be employed for monitoring or caregiving via the MDC 110. Flexibility may also be bolstered by the mobility of the mobile communication devices, which need not be in proximity to the MDC 110 in order to receive data or transmit control actions. Various embodiments also support flexibility in relation to permissions and degrees of caregiving. In some implementations, one mobile communication device may be given one level of permission, and another mobile communication device may be given a different level of permission for the same MDC 110. Further, various embodiments support enhanced security to prevent accidental or otherwise inappropriate remote access to the MDC 110. One or a defined number of authorized caregivers may be granted access. As a consequence, one or more embodiments provide widely scalable applications from individual consumers to Enterprise-like or commercial solutions such as nursing homes and hospitals where both patients and caregivers form part of a single large community of interest. By providing bi-directional closed-loop, secure and well-controlled communications between the MDC 110 and wireless communication devices 130, 130', etc. caregivers in active roles may effectively help infirm patients without necessarily interfering with patient privacy and independence for unrelated life functions. According to some embodiments, multiple care givers can assign and/or exchange roles, provided they are granted appropriate permissions (e.g. supervisor/administrator role), remotely from their mobile communication devices 130, 130', etc., so that they collaboratively share the care giving responsibilities to a patient without the patient having to worry about such assignment or coordination. Changes in the roles and permissions can, for example, be logged centrally at the MDC 110 so that traceability and security are maintained.

The embodiments set forth above are for illustration, and although one or more particular embodiments of the system and method have been described herein, changes and modifications may be made thereto. For example, a person of skill in the art will appreciate that the method of configuring a wireless mobile communication device to communicate with the medical device in a predetermined role, as set forth herein, may be extended to the control of multiple patients by a single caregiver via a wireless mobile communication device, or the control of multiple patients by multiple caregivers via respective wireless mobile communication devices, using the mapping process of FIG. 4 with appropriate request/authentication/role-granting steps for multiple patient medical devices and caregiver(s) communication device(s).

Also, although the exemplary embodiment has been described in terms of providing care to a diabetic child patient receiving treatment via an insulin pump, the principles set forth herein may be applied to other medical scenarios where remote care giving would be advantageous (e.g. patients using ventilators, implanted cardiac defibrillators, dialysis devices, etc.). All such embodiments and applications are believed to be within the scope of this disclosure in its broadest aspects and as set forth in the following claims.

The invention claimed is:

1. A method for monitoring and controlling at least one medical device using at least one of a plurality of wireless mobile communication devices, comprising:
    transmitting an add request to one of said plurality of wireless mobile communication devices;
    receiving a device-ID and authentication key from said one of said plurality of wireless mobile communication devices;
    processing said authentication key to determine if said wireless mobile communication device is an authenticated wireless mobile communication device and if said wireless mobile communication device is authenticated then assigning a role to said wireless mobile communication device, storing said device-ID, authentication key and role as one of one or more authenticated wireless mobile communication devices, and transmitting a confirmation to said wireless communication device, wherein said role is selected from a plurality of medical caregiver roles that each includes permissions for monitoring and controlling said at least one medical device, wherein said role is stored at a medical device connector for facilitating monitoring and control of said at least one medical device by said at least one of a plurality of wireless mobile communication devices, and if said wireless mobile communication device is not authenticated then transmitting a request failure to said wireless mobile communication device; and
    enabling at least one of monitoring data from said at least one medical device and controlling said at least one medical device by said authenticated wireless mobile communication device;

wherein said monitoring further comprises:
  receiving a request from said wireless mobile communication device for data relating to said at least one medical device, said request including said device-ID and authentication key;
  determining if said device-ID and authentication key indicate that said wireless mobile communication device is one of said authenticated wireless mobile communication devices; and
  if said the wireless mobile communication device is one of said authenticated wireless mobile communication devices then collecting said data from said at least one medical device and wirelessly transmitting said data to said wireless mobile communication device, and otherwise transmitting an authentication error to said wireless mobile communication device;
wherein said controlling further comprises:
  receiving a control action from said wireless mobile communication device for controlling said at least one medical device, said control action including said device-ID and authentication key;
  determining if said device-ID and authentication key indicate that said mobile communication device is one of said authenticated wireless mobile communication devices and said role includes a permission to take said control action; and
  if said mobile communication device is one of said authenticated wireless mobile communication devices and said role includes permission to take said control action then transmitting said control action to said at least one medical device, collecting said data from said at least one medical device following said control action, and wirelessly transmitting said data to said wireless mobile communication device, and otherwise transmitting an error message to said wireless mobile communication device.

2. The method of claim 1 wherein said at least one, medical device is an insulin pump, said monitoring of data includes monitoring blood glucose level and said controlling includes administering insulin via said insulin pump.

3. The method of claim 1, further comprising regulating said transmitting of said control action according to predetermined governance criteria to prevent a race condition between said control action and any other pending control action.

4. The method of claim 3, wherein said governance criteria includes at least one of a threshold for accumulative dose intake, or acknowledgement of completion of said pending control action.

5. A medical device connector for facilitating monitoring and control of a medical device by at least one of a plurality of wireless mobile communication devices, comprising:
  a memory;
  a communication subsystem for transmitting an add request to one of said plurality of wireless mobile communication devices, and receiving a device-ID and authentication key from said one of said plurality of wireless mobile communication devices;
  a microprocessor configured for processing said authentication key to determine if said wireless mobile communication device is an authenticated wireless mobile communication device and if said wireless mobile communication device is authenticated then assigning a role to said wireless mobile communication device, storing said device-ID and authentication key as one of one or more authenticated wireless mobile communication devices within said memory, and transmitting a confirmation to said wireless communication device, said role is selected from a plurality of medical caregiver roles each including permissions for monitoring and controlling said medical device, the microprocessor further configured for storing said roll within said memory, and if said wireless mobile communication device is not authenticated then transmitting a request failure to said wireless mobile communication device via said communication subsystem;
  said microprocessor configured for collecting monitored data from said at least one medical device and wirelessly transmitting said monitored data to said wireless mobile communication device when receiving from said wireless mobile communication device a request that includes said device-ID and authentication key after determining if said device-ID and authentication key indicate that said wireless mobile communication device is one of said authenticated wireless mobile communication devices;
  said microprocessor configured for transmitting a control action to said at least one medical device when receiving from said wireless mobile communication device said control action including said device-ID and authentication key after determining if said device-ID and authentication key indicate that said wireless mobile communication device is one of said authenticated wireless mobile communication devices and said role includes a permission to take said control action; and
  a data port for monitoring data from said medical device and transmitting data received from said authenticated wireless mobile communication device via said communication subsystem for controlling said medical device.

6. The medical device connector of claim 5 wherein said communication subsystem includes one or more receivers, transmitters, antennas, signal processors and other components associated with wireless communications.

7. The medical device connector of claim 5 wherein said data port is a serial port.

8. A method of operating a wireless mobile communication device for monitoring and control of at least one medical device connected to a medical device connector, comprising:
  receiving an add request from said medical device connector;
  processing said add request and in response generating a device-ID and authentication key;
  transmitting said device-ID and authentication key to said medical device connector;
  receiving one of either a confirmation that said wireless mobile communication device has been authenticated by said medical device connector, said confirmation including a medical connector device-ID and a role assigned to said wireless mobile communication device, or a request failure in the event said wireless mobile communication device is not authenticated by said medical device connector;
  in the event of receipt of said confirmation then storing said medical device connector ID assigned role and authentication key as one of one or more authenticated medical device connectors, or in the event of receipt of said request failure then logging said failure;
  transmitting a request to said medical device connector for data relating to said medical device, said request including said device-ID and authentication key;
  receiving and displaying one of either data collected from said medical device by said medical device connector in the event said wireless mobile communication device has been authenticated by said medical device connector or an authentication error in the event said wireless mobile communication device is not authenticated by said medical device connector;

transmitting a control action to said medical device connector for controlling said at least one medical device, said control action including device-ID and authentication key; and receiving and displaying one of either data collected from said medical device by said medical device connector in the event said wireless mobile communication device has been authenticated by said medical device connector, said role is selected from a plurality of medical caregiver roles that each includes permission to take said control action, said role stored in memory of said medical device connector, and said control action has been successfully implemented, or an authentication error in the event said wireless mobile communication device is not authenticated by said medical device connector or said role does not include permission to take said control action.

9. The method of claim 8 wherein said at least one medical device is an insulin pump, said data collected from said medical device includes blood glucose level and said control action includes administering insulin via said insulin pump.

10. The method of claim 8, further comprising regulating said transmitting of said control action according to predetermined governance criteria to prevent a race condition between said control action and any other pending control action.

11. The method of claim 10, wherein said governance criteria includes at least one of a threshold for accumulative dose intake, or acknowledgement of completion of said pending control action.

12. A wireless mobile communication device for facilitating monitoring and control of at least one medical device via a medical device connector, comprising:

a memory;

a communication subsystem for receiving an add request from said medical device connector;

a microprocessor configured for processing said add request and in response generating a device-ID and authentication key, transmitting said device-ID and authentication key to said medical device connector and receiving via said communication subsystem one of either a confirmation that said wireless mobile communication device has been authenticated by said medical device connector, said confirmation including a medical connector device ID and a role assigned to said wireless mobile communication device, or a request failure in the event said wireless mobile communication device is not authenticated by said medical device connector, and storing said one of either said confirmation and authentication key or said request failure in said memory, wherein said monitoring includes transmitting a control action to said medical device connector for controlling said at least one medical device, said control action including device-ID and authentication key, receiving and displaying one of either data collected from said medical device by said medical device connector in the event said wireless mobile communication device has been authenticated by said medical device connector, said role is selected from a plurality of medical caregiver roles that each includes permission to take said control action, said role being stored in memory of said medical device connector, and said control action has been successfully implemented, or an authentication error in the event said wireless mobile communication device is not authenticated by said medical device connector or said role does not include permission to take said control action, and wherein said controlling includes transmitting a control action to said medical device connector for controlling said at least one medical device, said control action including device-ID and authentication key, receiving and displaying one of either data collected from said medical device by said medical device connector in the event said wireless mobile communication device has been authenticated by said medical device connector, said role includes permission to take said control action, and said control action has been successfully implemented, or an authentication error in the event said wireless mobile communication device is not authenticated by said medical device connector or said role does not include permission to take said control action.

13. The mobile communication device of claim 12 wherein said communication subsystem includes one or more receivers, transmitters, antennas, signal processors and other components associated with wireless communications.

* * * * *